A. P. WOOD & R. S. McLEOD.
APPARATUS FOR ELECTRICALLY OPERATING PLANING MACHINES AND THE LIKE RECIPROCATING TOOLS.
APPLICATION FILED DEC. 27, 1913.
1,232,150.  Patented July 3, 1917.
10 SHEETS—SHEET 1.
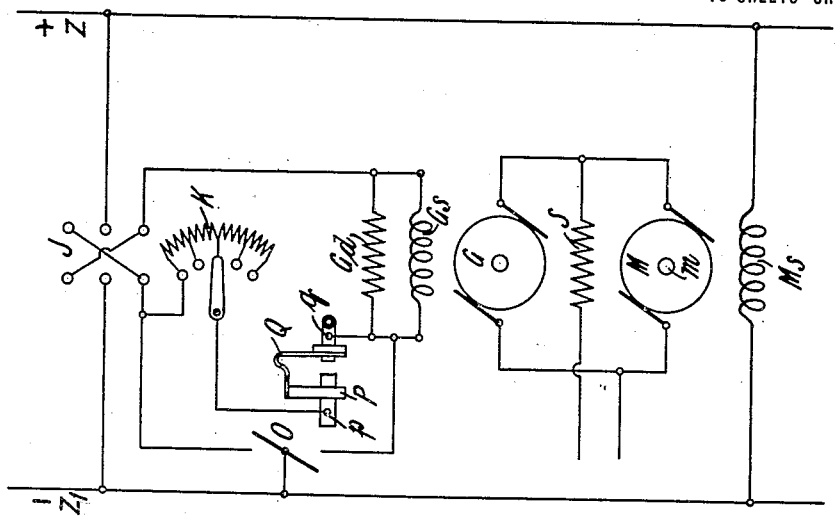
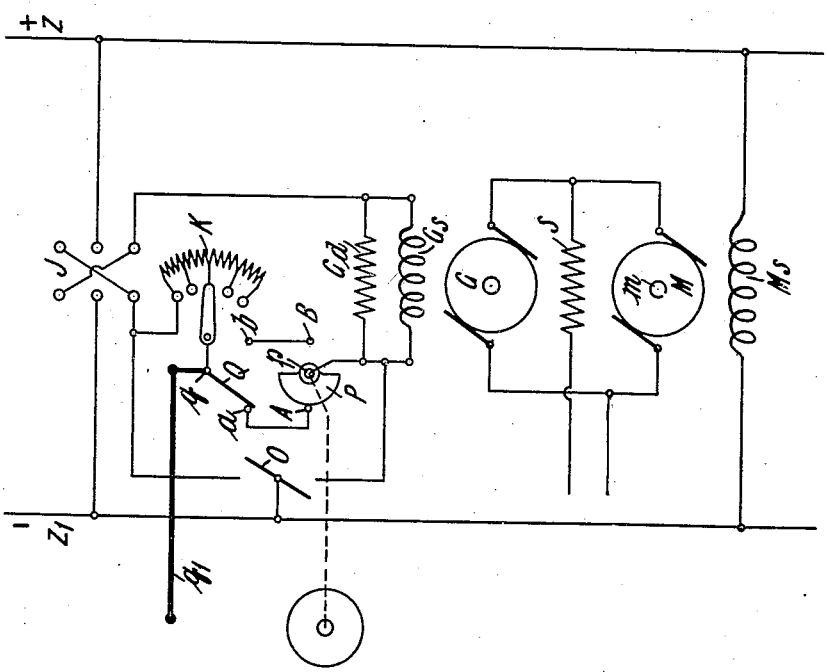

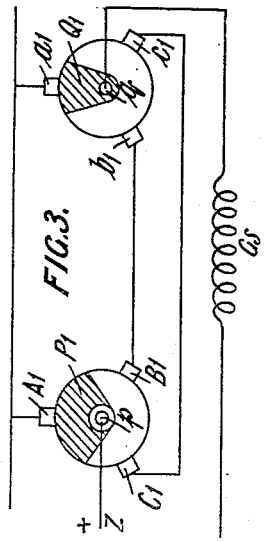
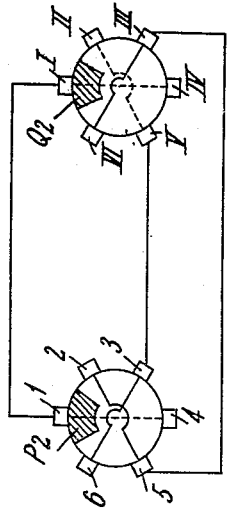
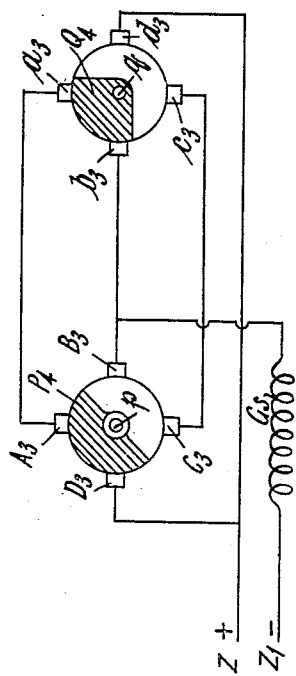
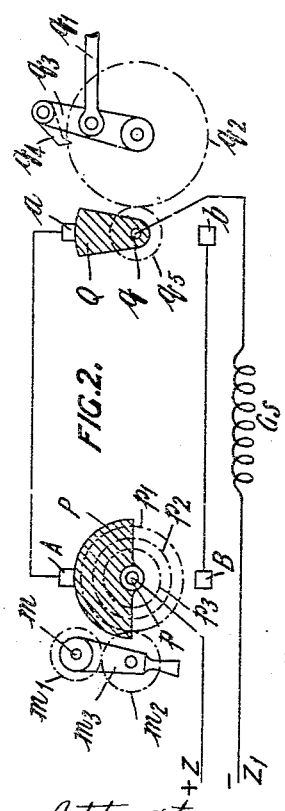
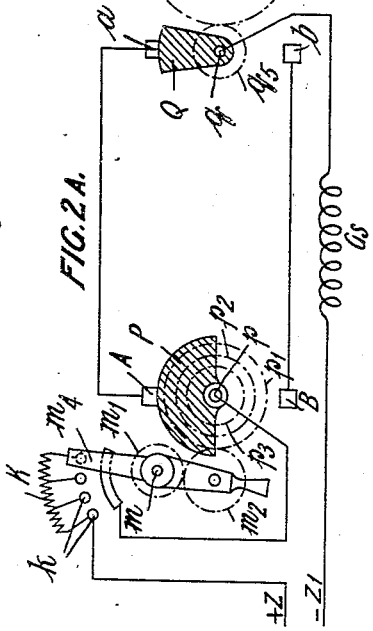
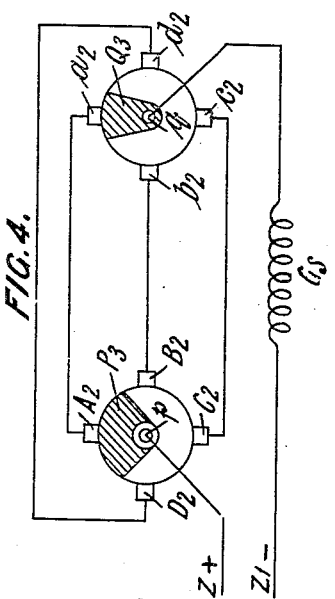

A. P. WOOD & R. S. McLEOD.
APPARATUS FOR ELECTRICALLY OPERATING PLANING MACHINES AND THE LIKE RECIPROCATING TOOLS.
APPLICATION FILED DEC. 27, 1913.

1,232,150.

Patented July 3, 1917.
10 SHEETS—SHEET 3

Attest:
Ewd L. Tolson
H. L. Alden

Inventors:
Arthur P. Wood, &
Robert S. McLeod,
by Spear, Middleton, Donaldson & Spear
Attys

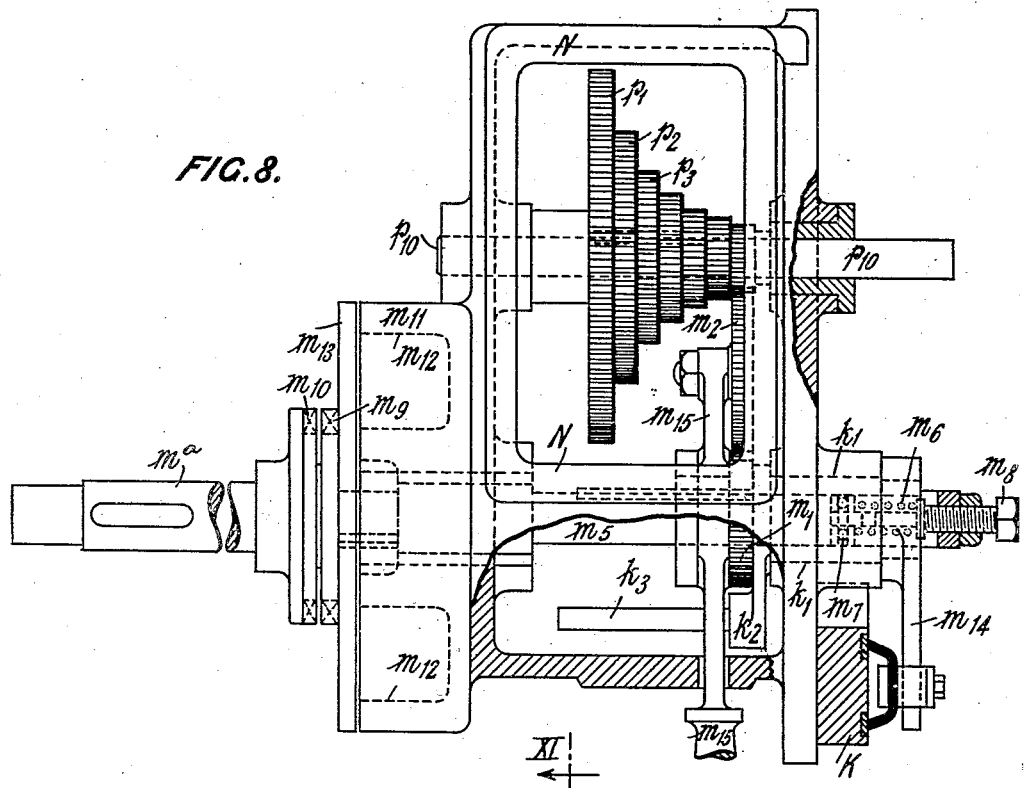
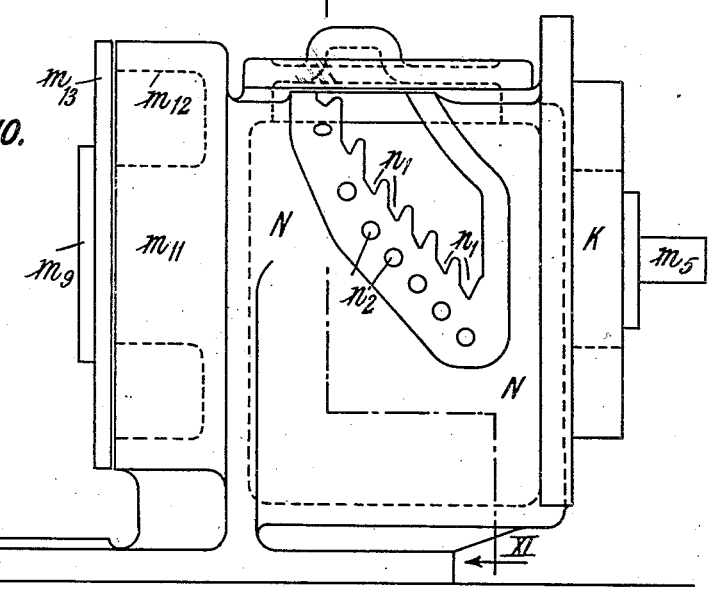

A. P. WOOD & R. S. McLEOD.
APPARATUS FOR ELECTRICALLY OPERATING PLANING MACHINES AND THE LIKE RECIPROCATING TOOLS
APPLICATION FILED DEC. 27, 1913.

1,232,150.

Patented July 3, 1917.
10 SHEETS—SHEET 6.

A. P. WOOD & R. S. McLEOD.
APPARATUS FOR ELECTRICALLY OPERATING PLANING MACHINES AND THE LIKE RECIPROCATING TOOLS.
APPLICATION FILED DEC. 27, 1913.
1,232,150.
Patented July 3, 1917.
10 SHEETS—SHEET 7.
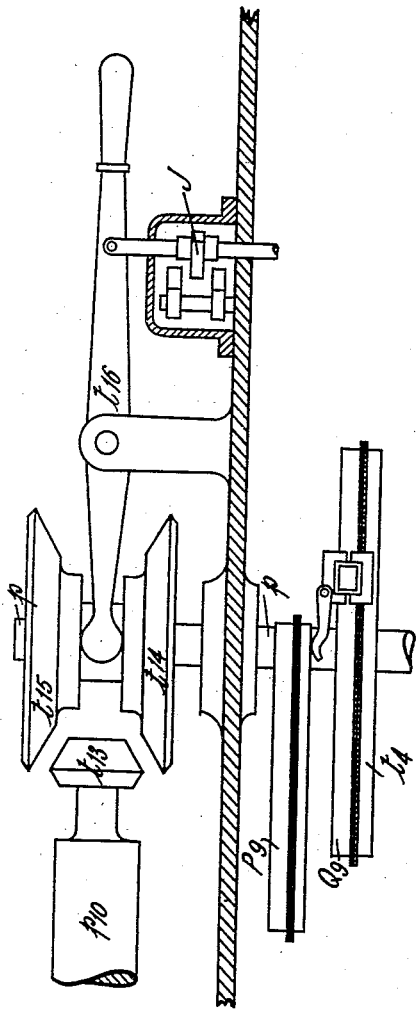
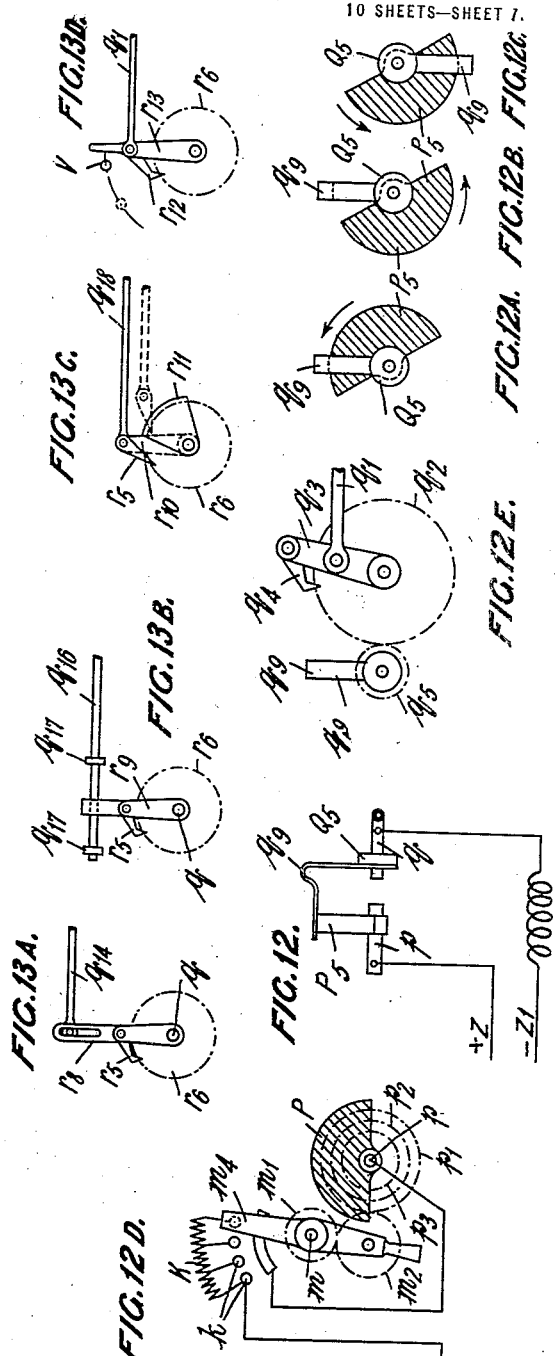
Attest:
Ewd L. Tolson
H. L. Alden
Inventors:
Arthur P. Wood,
Robert S. McLeod,
by Spear, Middleton, Donaldson & Spear
Attys

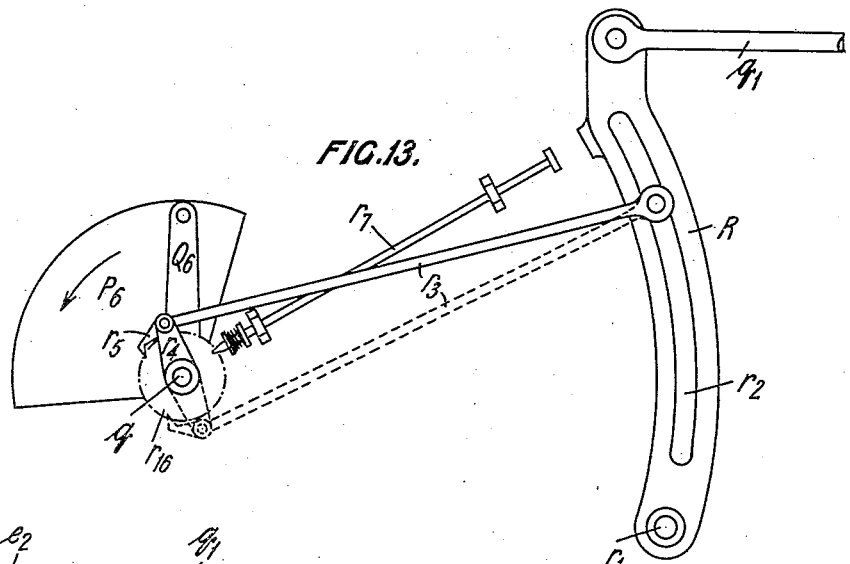
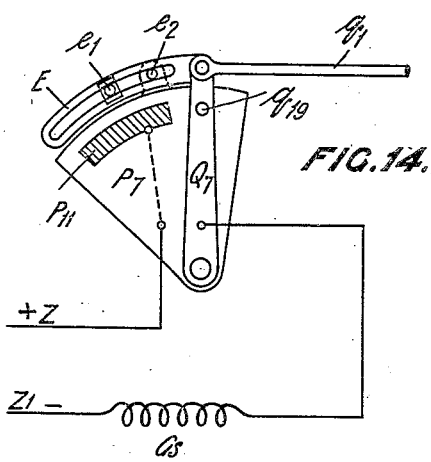
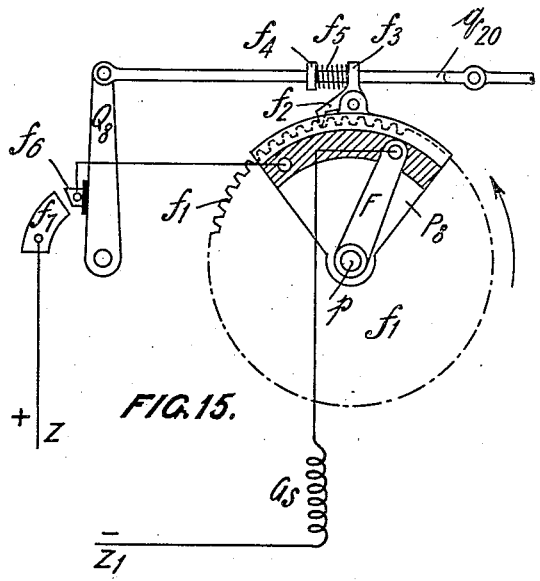

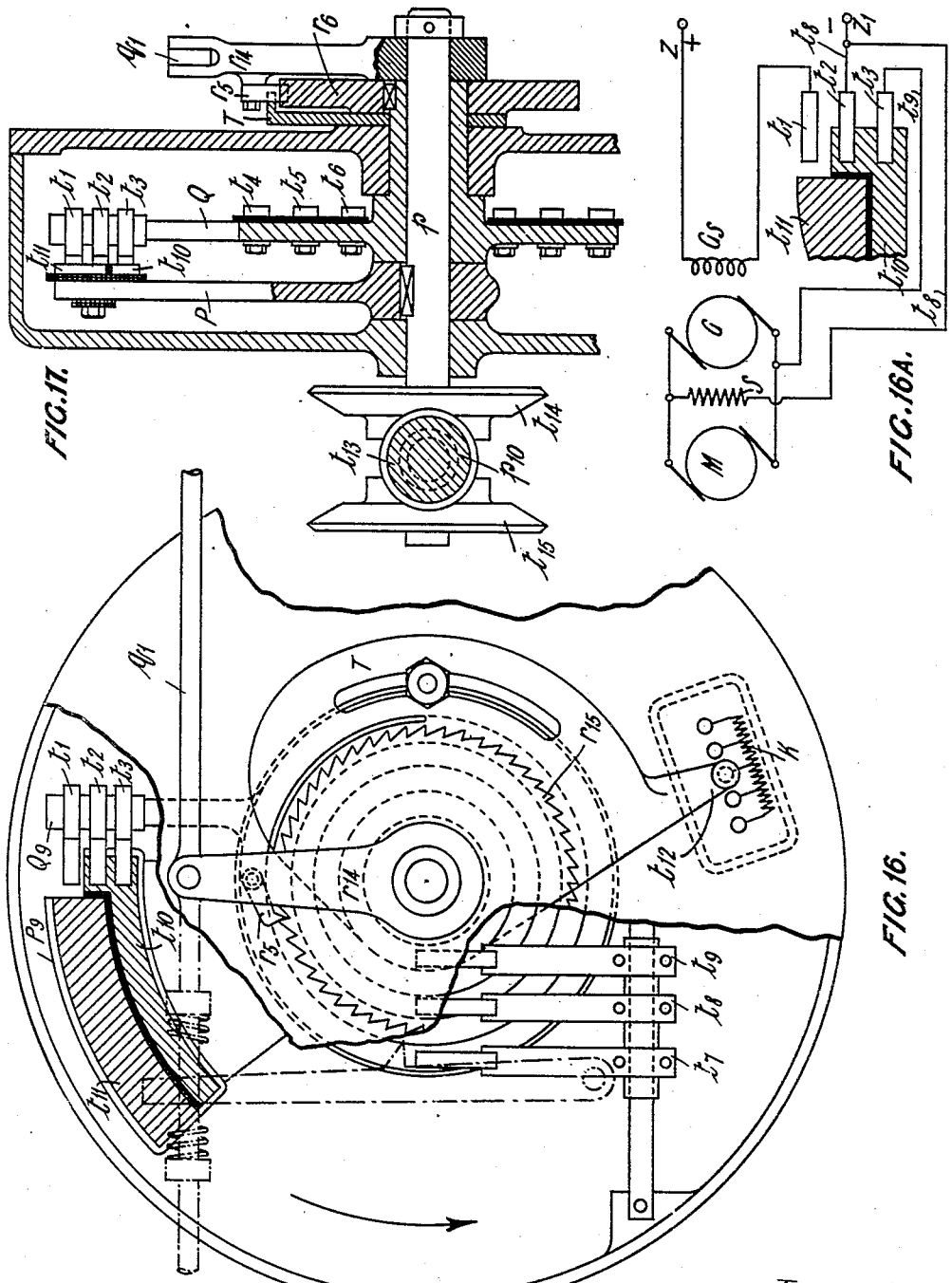

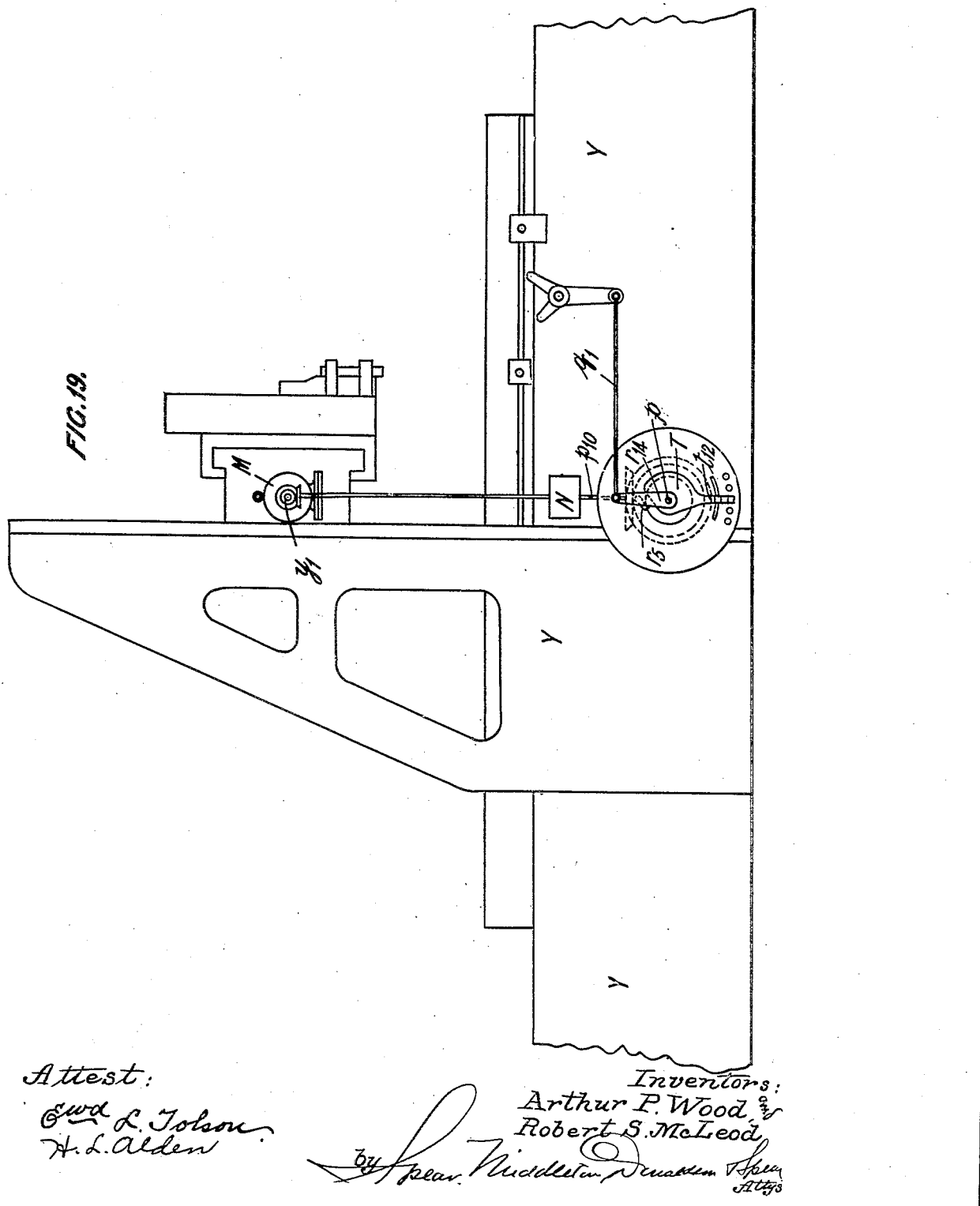

UNITED STATES PATENT OFFICE.

ARTHUR PEMBERTON WOOD, OF HALE, AND ROBERT STAFFORD McLEOD, OF DIDSBURY, NEAR MANCHESTER, ENGLAND.

APPARATUS FOR ELECTRICALLY OPERATING PLANING-MACHINES AND THE LIKE RECIPROCATING TOOLS.

1,232,150.   Specification of Letters Patent.   Patented July 3, 1917.

Application filed December 27, 1913.   Serial No. 809,125.

*To all whom it may concern:*

Be it known that we, ARTHUR PEMBERTON WOOD, a subject of the King of Great Britain, and residing in Hale, in the county of Chester, England, and ROBERT STAFFORD McLEOD, a subject of the King of Great Britain, and residing in Didsbury, near Manchester, in the county of Lancaster, England, have invented certain new and useful Improvements in Apparatus for Electrically Operating Planing-Machines and the like Reciprocating Tools, of which the following is a specification.

This invention relates to switch gear by means of which the movement of a reciprocating tool such as a planing machine is adapted to automatically control the movement of the electric motor by which the feed screw of the tool is operated.

In such gear it is necessary, after a cutting stroke has been made, that the motor by which the feed screw is actuated should be rotated through a definite angular amount, and such rotation should preferably take place after the return stroke of the tool has been made and be completed before the succeeding cutting stroke is commenced.

Reciprocating tools are provided with an adjustable tappet gear by means of which movement is imparted at the end of the cutting stroke or at the end of the return stroke, as may be preferred, to a suitable movable piece such as a tappet rod, and according to the present invention the movement so given to the said part, say a tappet rod, is utilized to close the energizing circuit of the feed motor, whereupon this motor commences to rotate; the amount of rotation of the motor required depends upon the feed which it is desired to give to the tool, and according to the present invention, the movement of the electric motor itself, while effecting the predetermined amount of feed, is utilized to open the energizing circuit of the motor, and if necessary to actuate an electrically operated brake, or to close the circuit of a brake resistance in series with the motor armature.

The invention is applicable generally for controlling the energizing circuit of the motor; such circuit may be the main motor circuit, but preferably the arrangement for operating a feed motor to which the invention is applied, is as follows:—

A constantly driven generator is provided, the armature of which is connected in series with the armature of the feed motor. The field winding of the generator is adapted to be connected across a suitable source of potential by means of switch gear operated by the joint action of the machine tappet gear and the movement of the feed motor.

When the field winding of the generator is connected to a suitable source of potential, the feed motor is supplied with current from the generator, and rotates. When the said circuit is opened, the supply of current ceases and the motor stops. The switch gear described hereinafter is adapted to control the said field winding of the generator.

According to one modification, two switches are inserted in the said circuit so that when both are closed the field winding is connected to a source of potential, and one of the said switches is operated by the planer tappet gear and the other is actuated by the rotation of the motor.

In another modification, one switch having two moving parts is used, one moving part being actuated by the planer tappet gear and the other by the motor.

The invention is illustrated in the accompanying drawings, in which:—

Figure 1 shows diagrammatically the general arrangement when two switches are employed, Fig. 1A is a similar view showing the alternative arrangement with the one switch having two movable parts.

Figs. 2 to 4 show diagrammatically modifications of the switches and connections suitable for the arrangement of Fig. 1.

Figs. 8, 9, 10 and 11 show a suitable construction of motor operated switch fitted with change gear.

Figs. 12 to 15 show diagrammatically modifications of the switches and connections suitable for the arrangement of Fig. 1A.

Figs. 16, 16A, 17 and 18 show a suitable construction of switch jointly operated by the tappet gear and the motor; and Fig. 19 shows the general arrangement of a planing machine fitted with the feed motor and switch gear as illustrated in Figs. 16 to 18.

Figure 5:
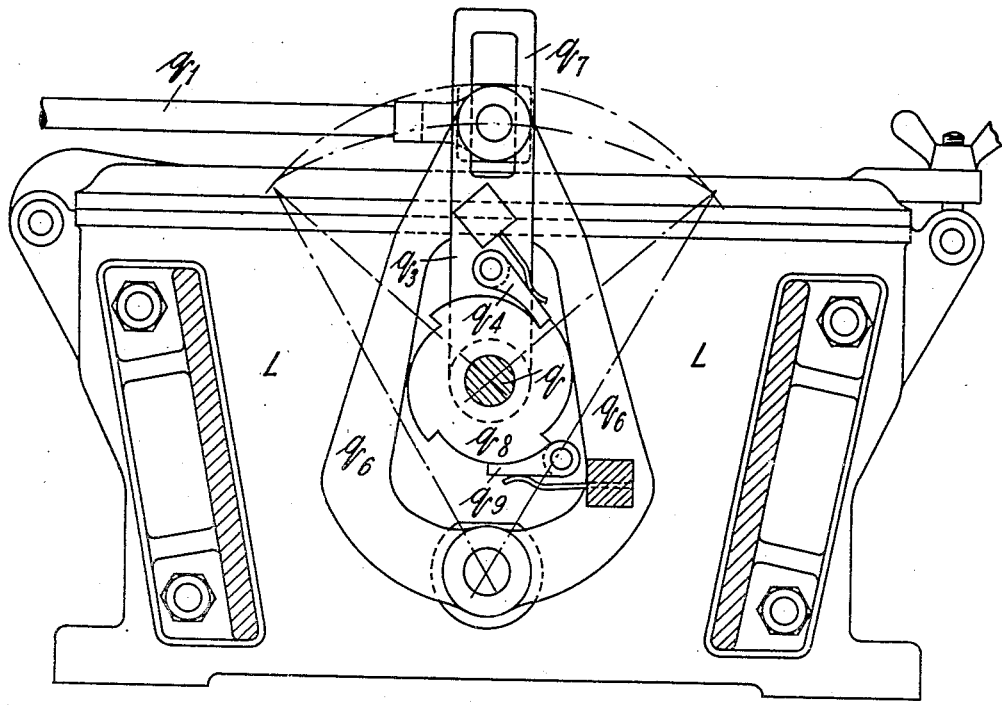
Figs. 5, 6 and 7 show a suitable construction of tappet operated switch.

Referring in the first instance to Fig. 1:— M is the motor armature, the spindle $m$ of which actuates the feed screw of the tool, and the motor operated switch P. $Ms$ is the field winding of the motor; G is the generator armature which is constantly driven by a suitable driving motor and which is connected in series with M; $Gs$ is the generator field, and $Gd$ is a discharge resistance.

$Gs$ is adapted to be connected across the $+$ and $-$ mains Z, $Z^1$, preferably through a regulating resistance K and a reversing switch J. This circuit will be referred to as the motor energizing circuit, and the switch gear hereinafter referred to is preferably inserted in this circuit. In Fig. 1 P is the switch operated by the feed motor spindle $m$ and Q the switch operated by the tappet rod $q^1$ of the tool. O is a switch adapted to close the circuit of $Gs$ independently of P, Q and K and is used when the motor is required to operate the feed screw for traversing purposes.

S is a brake resistance which is adapted to be connected across the armatures G and M to arrest rotation when the circuit of $Gs$ is broken; the switch for controlling S may be combined with the switches P and Q as described hereinafter.

In Fig. 1 the rod $q^1$ of the tappet gear (which gear may be arranged as shown in Fig. 19) is connected to the switch Q so as to move it at successive strokes alternately to and fro between the contacts $a$ and $b$; the switch P is geared through the switch spindle $p$ and motor spindle $m$ to the motor M, and as it rotates it makes contact with either contact A or contact B. When Q makes contact with $a$ and P makes contact with A, the circuit of $Gs$ is complete through K; the motor and switch P are rotated till P breaks contact with A whereupon the motor stops, the switch P then making contact with B; on the next stroke of the tappet gear, Q is moved to $b$, whereupon the motor is again started and continues to rotate till P leaves B whereupon the motor stops leaving P in contact with A, and so on.

The spindle $m$ of the feed motor M is geared to the feed screw $y^1$ of the planing machine Y (as shown in Fig. 19), and also to the switch spindle $p$.

The mode in which the motor spindle $m$ is geared to the switch spindle $p$, and the mode in which the tappet gear operates the spindle $q$ are shown in Fig. 2. Referring now to Fig. 2:—The motor switch P would be a rotating disk P geared as described to the motor spindle $m$; the gearing comprises a series of change wheels $p^1$, $p^2$, $p^3$, laterally disposed and keyed on the switch spindle $p$, a wheel $m^1$ keyed to the motor spindle $m$, and intermediate wheel $m^2$ mounted on a stud on the pivotally adjustable lever $m^3$.

Half or somewhat more than half of the circumference of the disk P would be conducting and the other half of which would be cut away or be insulated. The motor switch P has two fixed contacts A and B arranged relatively to the disk at opposite points of the diameter. The conducting surface of the disk would be permanently connected through the spindle $p$ and a suitable source of potential to one end of the field winding $Gs$ of the generator which actuates the motor M. The other end of the said field winding would be connected through the spindle $q$ to the blade of the tappet switch Q; this switch is a rotary switch adapted to make contact, when actuated by the tappet gear, with one or other of two contacts $a$ and $b$ respectively. A is connected to $a$ and B is connected to $b$.

The switch Q is shown in Fig. 2 as being operated, through spur wheel $q^2$, by a pawl lever $q^3$, pawl $q^4$ and rod $q^1$, the latter being actuated by the planer tappet gear; the wheel $q^2$ gears with a wheel $q^5$ keyed on $q$.

Assuming the motor switch P to be in contact with A, then if the tappet gear moves the tappet switch so that it makes contact with $a$, the field magnet winding $Gs$ of the generator will be energized and the motor consequently caused to rotate; the motor will continue to rotate until the motor switch P leaves the contact A, thus breaking the field circuit of the generator preferably through a discharge resistance $Gd$, Fig. 1, and leaving the motor switch in contact with the contact B; the next operation of the tappet switch moves it into contact with $b$, again completing the circuit of the generator field, and consequently rotating the motor until the motor switch leaves the contact B; in this way each operation of the tappet switch imparts a definite angular movement to the motor which angular movement is imparted to the feed screw.

By arranging for the wheel $m^2$ to gear with the appropriate wheel of the set $p^1$, $p^2$, $p^3$, any desired extent of angular movement may be imparted to the motor while the switch moves over the contact during its half revolution. The motor may be coupled directly to the feed screw or it may be geared thereto by fixed or adjustable gearing; the more convenient arrangement however is the one illustrated in Figs. 8 to 11 in which the change wheels drive the switch and may therefore be of light construction.

The arrangement shown in Fig. 2A is similar to that already described in Fig. 2 except that the lever carrying the wheels $m^1$ and $m^2$ has a switch contact arm $m^4$ fitted to it which moves over the contacts $k$ of the rheostat K, so that the smaller the movement of the motor for the given switch movement as determined by the position of the change-gear, the greater is the amount of the resistance K interposed in the circuit.

Referring now to Fig. 3, in which, as in the further diagrams of connections to be described, the means already described for actuating the switches are, for clearness, omitted; in this modification instead of there being two contacts A and B only on the motor switch P and two corresponding contacts $a$ and $b$ on the tappet switch Q, there may be three contacts, $A^1$, $B^1$, and $C^1$ on the switch and three corresponding contacts $a^1$, $b^1$ and $c^1$ an the tappet switch; these contacts would be arranged 120° apart, and $A^1$ $a^1$, $B^1$ $b^1$, and $C^1$ $c^1$ would be connected together.

The conducting part of the motor switch $P^1$ in this modification only requires to be slightly in excess of one third of the circumference, and the tappet switch $Q^1$ is arranged so that successive actuations of it by the tappet cause it to engage with the contacts $a'$, $b'$ and $c'$ in succession.

The action is similar to that already described, except of course that the angular movement imparted to the motor switch is one third of a revolution. This arrangement is preferable to the arrangement first described, in which it will be seen that, should the motor over-run by an amount equal to its feed and give the switch a further movement of half a revolution, it would be possible for it to be continuously rotated and thus give an indefinite feed.

In the arrangement with three contacts, the over-run to give continuous rotation would require to be twice the normal angular movement of the motor.

Six contacts 1, 2, 3, 4, 5 and 6 on the one switch $P^2$ and I, II, III, IV, V and VI on the switch $Q^2$ may be fitted as shown in Fig. $3^A$, opposite contacts being connected; in this case the angular movement of the switch $Q^2$ would only need to be one sixth of a revolution.

In the modification shown in Fig. 4, four contacts $A^2$, $B^2$, $C^2$ and $D^2$ on the motor switch $P^3$ and four corresponding contacts $a^2$, $b^2$, $c^2$ and $d^2$ on the tappet switch $Q^3$ are arranged, in which case the conducting portion of the motor switch need only be slightly in excess of one quarter of the circumference of the disk, and continuous movement could only take place if the over-run were three times the normal angular movement of the motor.

More than four contacts such as A, B, C and D may be fitted; when three or more are fitted, it is necessary when the motor is to be reversed by reversing the field connections of the generator, for two of the connecting leads between the switches to be reversed; this would be accomplished by fitting a reversing switch to the feed reversing switch, such for example as the switch J previously referred to.

In the modifications described, in addition to the leads connecting the contacts A$a$, B$b$, C$c$, etc., the motor switch and the tappet switch require to be connected through the generator field and source of potential.

In a modification shown in Fig. $4^A$ in which there are four contacts $A^3$, $B^3$, $C^3$ and $D^3$ on the motor switch $P^4$, and four corresponding contacts $a^3$, $b^3$, $c^3$ and $d^3$ on the tappet switch $Q^4$, $A^3$ $a^3$, $B^3$ $b^3$, $C^3$ $c^3$ and $D^3$ $d^3$ being connected together as before, then if $A^3$, $B^3$, $C^3$ and $D^3$ and $a^3$, $b^3$, $c^3$ and $d^3$ be arranged say clock-wise, and counter-clock-wise respectively as shown in $4^A$, the same effect will be produced if two opposite contacts, say $A^3$ and $C^3$ on the motor switch, be connected to the generator field through a source of potential, and the motor switch and the tappet switch be arranged, respectively, always to span over two adjacent contacts. For instance if the motor switch is in contact with $A^3$ and $B^3$, and the tappet switch is in contact with $a^3$ and $d^3$, then the generator field circuit is completed through $B^3$, switch $P^4$, $A^3$, $a^3$, switch $Q^4$ and $d^3$; similarly, if the motor switch connects $B^3$ and $C^3$ together on the next movement, and the tappet switch on its next movement connects $d^3$ and $c^3$ together then the generator field circuit is completed through $B^3$, switch $P^4$, $C^3$, $c^3$, switch $Q^4$, and $d^3$.

Figure 7:
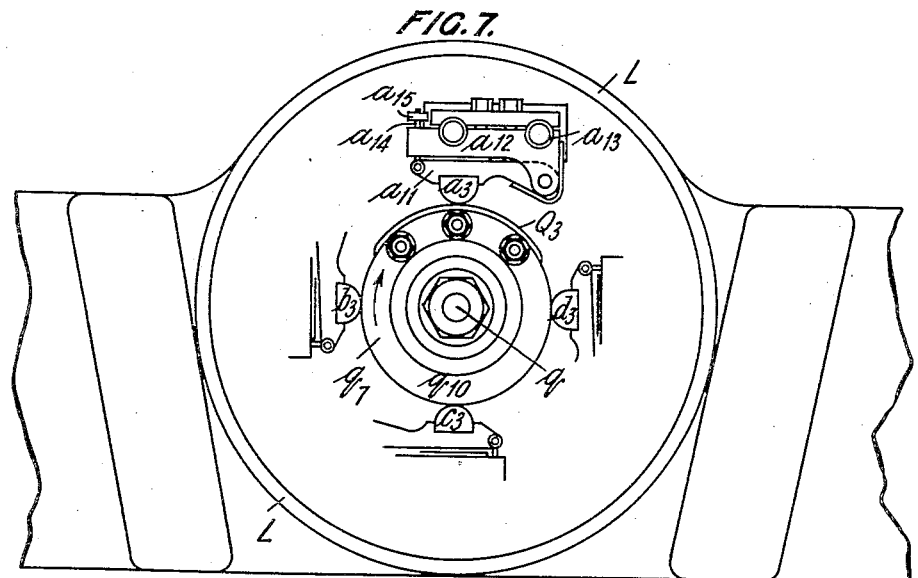
Figure 6:
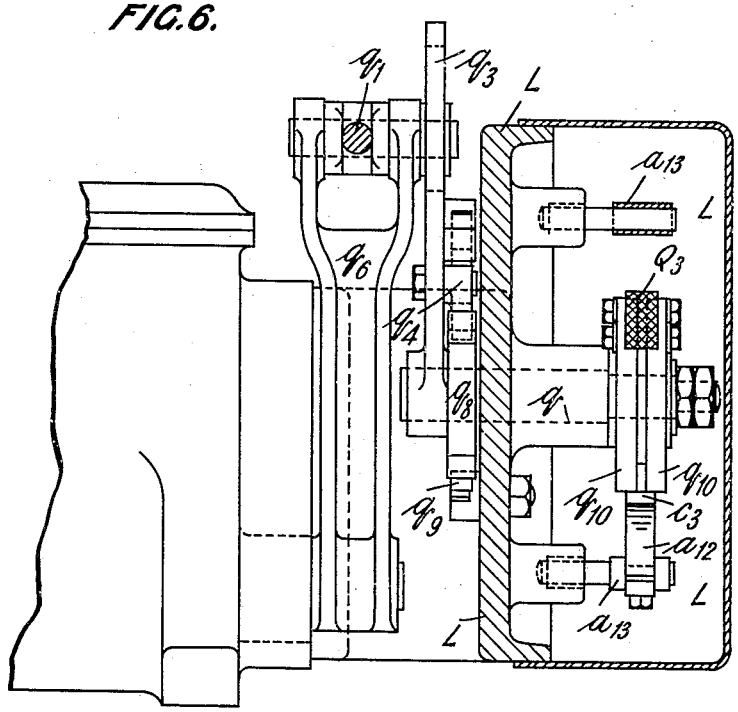
Figure 5A:
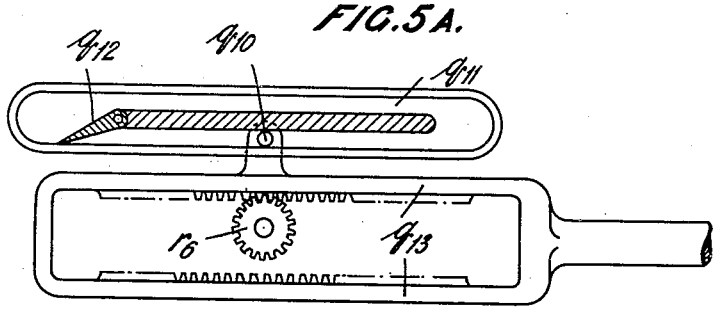

Figs. 5, 6 and 7 show the mode of construction of the tappet switch $Q^4$, illustrated in Fig. $4^A$.

Fig. 5 is an elevation with the switch casing removed, Fig. 6 a side elevation in the switch casing in section, and Fig. 7 is an elevation of the switch with the cover of the switch casing removed.

$q^1$ is the rod of the tappet gear, which in the arrangement illustrated is connected to a main driving motor reversing lever $q^6$. $q^7$ is a pawl lever articulated to the lever $q^6$ by a pin on the latter engaging in a slot in $q^7$. $q^4$ is a pawl, $q^8$ a ratchet mounted on the switch spindle $q$, and $q^9$ is a detent pawl carried from the casing L.

The tappet switch is carried from this spindle by two insulating plates $q^{10}$ and makes contact as it rotates with the contacts $a^3$, $b^3$, $c^3$ and $d^3$ as described in connection with Fig. $4^A$.

These contacts may be carried in any suitable way; in the drawings they are shown as renewable contacts carried as is common in dynamo brushes.

$a^{11}$ is a spring controlled contact lever pivoted to the frame $a^{12}$ carried from insulated collars $a^{13}$; the movement of $a^{11}$ is adjustably limited by the stud $a^{14}$ and nut $a^{15}$.

The switch gear is inclosed in a box L.

Figs. 8 to 11 show the mode of construction of the change speed gear for the motor operated switch, and the rheostat switch.

Figure 9:
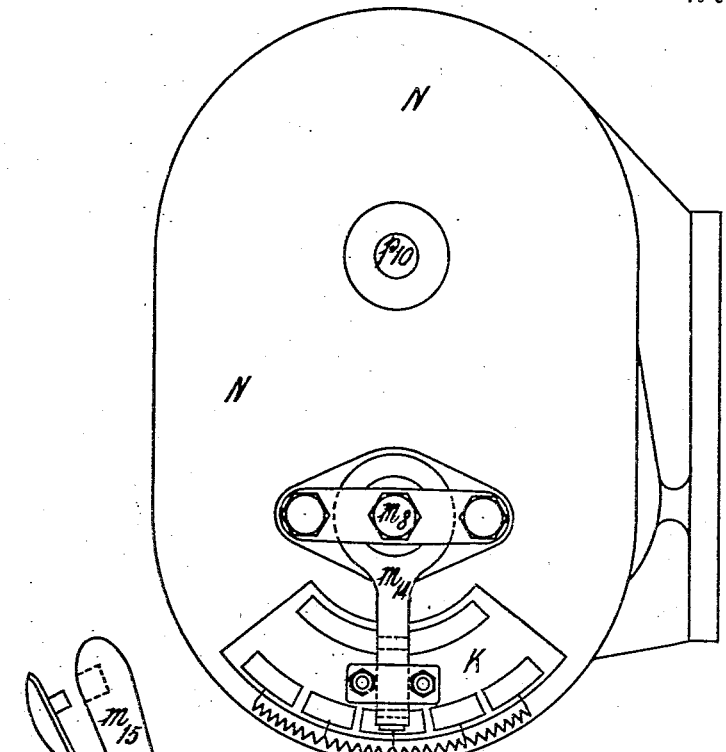
Figure 11:
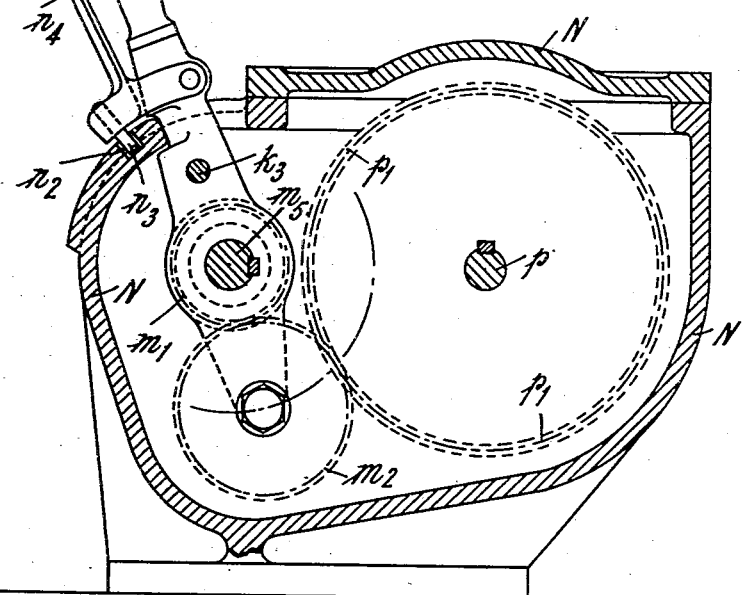

Fig. 8 is a plan partly in section and with the cover of the gear box removed. Fig. 9 is an elevation; Fig. 10 is a side elevation and Fig. 11 is a transverse section on the line XI, XI, of Fig. 10, showing the hand lever in position with the intermediate wheel gearing with the largest diameter change wheel.

The motor switch spindle $p^{10}$ is driven by the change wheels $p^1$, $p^2$, $p^3$, etc., through the intermediate wheel $m^2$ mounted on the lever $m^{15}$ which is driven by the wheel $m^1$ feathered on the spindle $m^5$ which is driven by a clutch $m^9$ and $m^{10}$ from the spindle $m^a$ which may be a motor spindle or a continuation thereof. The spindle $m^5$ is pressed to the left by the spring $m^6$ (exerting pressure through the ball race $m^7$ and adjusted by the screw $m^8$) so that the clutch member $m^9$ on the spindle $m^5$ normally engages with the clutch member $m^{10}$ on the shaft $m$ which latter clutch member and shaft $m^a$ are fixed axially.

The clutch member $m^9$ is attached to a plate $m^{13}$ which forms the armature of an annular magnet $m^{11}$ energized by a coil $m^{12}$. When it is desired to actuate the feed screw for traversing purposes, the traversing switch O (see Figs. 1 and 1A) is closed, whereupon the circuit of the magnet winding $m^{12}$ is energized and the spindle $m^5$ is disconnected from the spindle $m^a$ by the axial movement of the armature $m^{13}$ and the clutch member $m^9$.

The lever $m^{15}$ is pivoted on the boss of the pinion $m^1$ so that the lever and pinion can slide on the spindle $m^5$.

The switch actuated by the motor is driven by the spindle $p^{10}$ through direction changing bevel gear as shown in Figs. 16 to 18.

The gear is inclosed by a casing N, and the handle of the lever $m^{15}$ projects through an opening in the casing which opening is provided with steps $n^1$ and with locking holes $n^2$ to take the pin $n^3$ on the locking lever $n^4$ (see Fig. 11).

It will be seen from an inspection of Figs. 8, 10 and 11 that by moving the lever to the appropriate step and locking it in the appropriate locking hole the intermediate wheel $m^2$ may be geared with any of the change wheels $p^1$, $p^2$, $p^3$, etc., to give the desired velocity ratio between the spindle $p^{10}$ and the spindle $m^5$.

K (Fig. 9) is the regulating resistance or rheostat and $m^{14}$ is the switch therefor. This switch arm (see Fig. 8) is connected through a bearing sleeve $K^1$ to a lever $k^2$ provided with an extension pin $k^3$ passing through a hole in the shank of the handle of the lever $m^{15}$; when the lever $m^{15}$ is moved to change gear, the switch $m^{14}$ is correspondingly moved so as to change the magnitude of the resistance K interposed in the circuit in accordance with the velocity ratio between the motor spindle and the switch spindle.

The motor switch has, of course, to be near the motor in consequence of its being geared to it, and if the tappet switch is operated by the tappet, it may be necessarily some distance away from the motor switch; the two rotating parts P and Q forming the switches may, however, in most cases be brought adjacent to one another and on to the same axis, as shown in Figs. 12, 12A and 12B, in which case the tappet switch $Q^5$ would be operated directly by the tappet gear, or where this is not possible through a rack, pinion and pawl, by a solenoid controlled by a secondary tappet switch; this simplifies the construction very considerably, for when, say by the action of the directly operated tappet gear or of the solenoid, the two parts $P^5$, and $Q^5$ are brought abreast by the rotation of $Q^5$, as in Fig. 12A, contact between them is established say by a spring arm $q^9$ on the one part $Q^5$ operated by the tappet gear; the motor and the other part $P^5$ attached to the motor move on until the said contact is broken as shown in Fig. 12B, whereupon the motor stops; the angular distance moved depending upon the angular movement imparted to $Q^5$. The next working stroke of the tappet gear brings the tappet switch $Q^5$ and arm $q^9$ again abreast of $P^5$, as shown in Fig. 12C, and the described cycle is then repeated.

$P^5$ is operated by the motor through a change speed gear see Fig. 12D as already described, and $Q^5$ is operated from the tappet rod $q^5$ by a ratchet gear see Fig. 12E as already described.

The electrical connections of $P^5$, $Q^5$ and $q^9$ are shown diagrammatically in Fig. 1A which is otherwise similar to Fig. 1.

Fig. 13 shows diagrammatically the arrangement when the arm $Q^6$ of the tappet switch is rotated in the direction of the arrow directly by the tappet gear, and the switch plate $P^6$ is geared to the motor so as to also move in the direction of the arrow when the motor rotates. The tappet rod $q^1$ operates the link R pivoted at $r^1$. R is provided with a slot $r^2$ in which the end of the rod $r^3$ can be secured at any desired distance from $r^1$. $r^3$ operates a pawl lever $r^4$, the pawl $r^5$ of which engages with the ratchet $r^{16}$ mounted on the spindle $q$ of the tappet switch; it will be seen that for a given movement of $q^1$ an adjustable angular movement in the direction of the arrow can be imparted to the switch arm $Q^6$.

The motor energizing circuit is connected to $Q^6$ through the spindle $q$ and to $P^6$ through the spindle $p$, as shown in Fig. 12. When therefore the switch arm $Q^6$ is brought abreast the switch plate $P^6$ the motor energizing circuit is completed, the motor rotates, carrying $P^6$ around in the direction of the arrow until contact between $P^6$ and $Q^6$ is again broken, whereupon the motor stops. On the next stroke of the tappet gear, $Q^6$ is moved forward over the switch plate $P^6$ by an angular amount depending upon the position of the end of the rod $r^3$ in the slot $r^2$, whereupon the motor energizing circuit is again completed and the motor rotated until contact is again broken; the amount of movement imparted to the motor at each operation is thus adjustable.

A spring controlled detent $r^7$ may be fitted to hold $Q^6$ in position after the working stroke of R has been made.

The lever $r^4$ may be made double ended and fitted with a reversed pawl as shown in dotted lines in Fig. 13, which is used when the direction of rotation of the motor is reversed.

In some cases it is desirable, say in a reversible tool planing machine which cuts on each stroke, that $Q^6$ should be operated on each stroke of the machine; the tappet gear as ordinarily arranged is operated in the one direction for a forward stroke and in the other direction for a return stroke, and in the arrangement described it will be necessary for $Q^6$ to be operated both on the forward and return strokes of the tappet $q^1$. This can be accomplished as shown in Fig. 5^A by making the end of the tappet rod into a double toothed rack $q^{13}$ the upper teeth of which engage with the ratchet $r^6$ on, say, the forward stroke, and the lower teeth of which engage with the ratchet on the return stroke.

In order to give this motion, the end of $q^{13}$ would be fitted with a pin $q^{10}$ fitting in a cam slot $q^{11}$ provided with a tongue switch $q^{12}$, the movement of the pin $q^{10}$ in the slot $q^{11}$ as $q^{13}$ makes its forward and return strokes insuring the alternate engagement of the two sets of teeth and imparting to $p^6$ an angular movement in the same direction for each stroke of $q^{13}$.

Instead of varying the stroke of the pawl lever $r^4$ Fig. 13 by means of a link such as R, the end of the tappet rod $q^{14}$ may be fitted in a slot in the pawl lever $r^8$ as shown in Fig. 13^A. Or, as shown in Fig. 13^B, the tappet rod $q^{16}$ may pass through a slot in the lever $r^9$ and be fitted with stops $q^{17}$ by which the amount of its free movement relatively to the pawl lever may be adjusted; or, as shown in Fig. 13^C, the tappet rod $q^{18}$ may be connected permanently to the pawl lever $r^{10}$ so as to give the latter a constant stroke, and an angularly adjustable mask $r^{11}$ may be fitted, the position of which determines the point of engagement of the pawl $r^5$ with the teeth of the ratchet $r^6$; or, as shown in Fig. 13^D, the pawl $r^{12}$ on the lever $r^{13}$ may be provided with a tail adapted to engage with an adjustable pin V adapted to disengage the pawl when the desired angular movement has been imparted to the ratchet $r^6$.

In the arrangement shown in Figs. 12 and 13, intermittent rotary movement in the one direction is given to the part $P^5$ and the part $Q^5$; these parts may, however, be so arranged that a to-and-fro angular movement only may be imparted; in this case, as shown in Fig. 14, $Q^7$ is directly connected to the tappet gear rod $q^1$ and $P^7$ is connected by a frictional gear with the motor spindle.

When $Q^7$ is moved counter-clockwise through a definite angular amount by the rod $q^1$, a contact $q^{19}$ on $Q^7$ comes over the shaded conducting area $p^{11}$ on $P^7$, thus completing the motor energizing circuit; movement of the motor now rotates $P^7$ by the frictional gear counterclockwise, and the said contact is broken. On the return movement of $q^1$, $Q^7$ is moved clockwise, and an adjustable catch $e^1$ carried by a slotted link E connected to $Q^7$ engages with the projection $e^2$ on the switch plate $P^7$ and draws it back through an angle depending upon the position of $e^1$ in the link E. $Q^7$ always returns to the same initial position, and is always moved therefrom counter-clockwise through the same angle; the movement made by the motor after contact has been established and before it is cut off, depends upon the position of the adjustable catch $e^1$.

Instead of relying upon a frictional drive between the motor and the switch plate $P^7$, a toothed wheel $e^3$ may be geared to the motor, and instead of a projection $e^2$ fixed to the plate $P^7$, a pawl $e^4$ may be pivoted to the plate $P^7$, as shown in Fig. 14^A so that the switch plate is positively driven forward by engagement between the pawl $e^4$ and wheel $e^3$ driven by the motor, said pawl being released from engagement with the wheel $e^3$ by the engagement therewith of the catch $e^1$ on the return stroke.

In the modification shown in Fig. 15, the switch plate $P^8$ is driven in the direction indicated by the arrow by a pawl $f^2$ pivoted to the switch plate and engaging with a ratchet $f^1$ driven in the said direction by the motor spindle. The pawl $f^2$ is provided with a tail piece $f^3$ through which an extension $q^{20}$ of the tappet rod passes. On the said extension a stop $f^4$ is fixed, and a spring $f^5$ is interposed between the stop and the tail piece.

When the tappet rod $q^{20}$ makes its return stroke to the right, the pawl $f^2$ is disengaged, and the switch plate $P^8$ is rotated by $q^{20}$ in the opposite direction to that indicated by the arrow, to a fixed initial position. When the tappet rod $q^{20}$ moves on its forward stroke to the left, a contact $f^6$ on the switch arm $Q^8$ makes contact with the plate $f^7$.

An adjustable but normally fixed lever F makes contact with a conducting part on $P^8$ which is electrically connected to $f^6$; thus on the forward movement of the tappet gear the motor energizing circuit is completed; the motor then rotates in the direction of the arrow, carrying with it the plate $P^8$, until contact between $P^8$ and F is broken, whereupon the motor stops; the amount of movement imparted to the motor depends upon the position of the lever F in relation to the initial position of P; when $q^{20}$ makes its return stroke to the left, contact is broken between $f^6$ and $f^7$, and the plate $P^8$ carried back to its initial position, thus establishing connection between F and $P^8$, whereupon the same action is repeated.

Figs. 16, 17 and 18 illustrate a mode of construction of the modification of Fig. 13 shown diagrammatically in Fig. $13^C$, Fig. 16 being an elevation with a portion of the casing broken away, Fig. 17 a section on an axial plane, and Fig. 18 a plan with the casing broken away. Fig. $16^A$ is a diagram of the connections.

$q^1$ is the tappet gear rod connected to a pawl lever $r^{14}$, carrying a pawl $r^5$ engaging with the ratchet $r^{15}$. $P^9$ is the motor switch plate keyed to the switch spindle $p$, which spindle is adapted to be driven by the motor spindle $m$ by suitable interposed gearing, as described in relation to Figs. 8 to 11 the shaft $p^{10}$ of Figs. 8 to 11 being connected to the bevel wheel $t^{13}$, Fig. 17.

T is a mask angularly adjustable about an axis $p$ whereby the angular movement imparted by the pawl $r^5$ to the ratchet $r^{15}$ may be regulated.

$Q^9$ is the tappet switch mounted on the spindle $p$ and on an extended boss of which the ratchet $r^{15}$ is keyed. $Q^9$ and $r^{15}$, though mounted on the spindle $p$, are not keyed thereto.

The switch arm carries three contacts $t^1$, $t^2$ and $t^3$, which are respectively connected by contact rings $t^4$, $t^5$ and $t^6$ to brush terminals $t^7$, $t^8$ and $t^9$.

When $P^9$ and $Q^9$ are in the relative positions shown in Fig. 16, the switch contacts $t^2$ and $t^3$ rest on a conducting part $t^{10}$ carried by the switch arm $P^9$; said conducting part is, however, insulated from the conducting part $t^{11}$, also carried by $P^9$.

$t^2$ is connected through $t^8$ to, say, the negative main, as shown in Fig. $16^A$ and to one end of the brake resistance S the other end of which is connected to one pair of brushes of the motor M and generator G; the other pair of brushes of the motor and generator are connected through $t^9$ to the switch contact $t^3$. In the position shown in Fig. $16^A$, the circuit of the resistance S is completed by the conducting part $t^{10}$ on the switch plate $P^9$.

On the forward movement of the tappet gear, $Q^9$ is moved angularly in the direction indicated by the arrow, relatively to $P^9$; the circuit of S is now open, but that of Gs (the motor energizing circuit) is closed, since the switch terminals $t^1$ and $t^2$ are connected by the conducting surface $t^{11}$. The motor therefore rotates and operates the feed screw, and at the same time moves the plate $P^9$ in the direction of the arrow until the motor energizing circuit is broken, when $t^1$ leaves $t^{11}$, and the brake circuit closes, when $t^2$ engages with $t^{10}$. The movement of $P^9$, and therefore of the motor, depends upon the angular movement imparted to $r^{15}$ which is regulated by the position of the mask T. K is the regulating resistance rheostat (see Fig. $1^A$) the magnitude of which is determined by the position of the switch arm $t^{12}$ carried by the mask T and which therefore depends upon the angular movement imparted to the motor.

When the direction of rotation of the motor has to be reversed, a bevel pinion $t^{13}$ on the spindle $p^{10}$ is changed from the bevel wheel $t^{14}$ to the bevel wheel $t^{15}$, so that $P^9$ and $Q^9$ rotate in the same direction as before. This movement is effected by a reversing handle $t^{16}$ which may also operate the reversing switch J (see Fig. $1^A$).

Having now fully described our invention, we declare that what we claim, and desire to secure by Letters Patent is:—

1. In apparatus for operating the feed screw of a reciprocating tool, in combination;—an electric motor adapted to drive the feed screw; a circuit, including a source of potential, which circuit when closed causes current to be supplied to the motor; a switch element in said circuit moved angularly by the feed motor when the latter rotates to effect the feed; a second switch element in said circuit intermittently moved angularly by the tool tappet gear; and means for varying the amount of angular movement of the last mentioned switch element; substantially as described.

2. In apparatus for operating the feed screw of a reciprocating tool, in combination;—an electric motor adapted to drive the feed screw; a circuit, including a source of potential, which circuit when closed causes current to be supplied to the motor; a switch element in said circuit moved angularly by the feed motor when the latter rotates to effect the feed; a second switch element in said circuit intermittently moved angularly by the tool tappet gear; means for varying the amount of angular movement of the last mentioned switch element; a resistance in said circuit; and a resistance rheostat device operated by said means and adapted to control the speed of the feed motor; substantially as described.

3. In apparatus for operating the feed screw of a reciprocating tool, in combination;—an electric motor adapted to drive the feed screw; a circuit, including a source of potential, which circuit when closed causes current to be supplied to the motor; a rotatable switch element in the said circuit; means operated by the tappet gear and comprising a ratchet wheel, pawl and reciprocating lever for imparting intermittent rotary motion to the said element; and a second rotatable switch element in the said circuit geared to the feed motor spindle by direction changing gear; substantially as described.

4. In apparatus for operating the feed-screw of a reciprocating tool, in combination;—an electric motor adapted to drive the feed screw; a circuit, including a source of potential, which circuit when closed causes current to be supplied to the motor; a switch element having a conducting part mounted on a disk geared to the feed motor so as to rotate therewith; a switch element comprising two contacts mounted on a part rotated intermittently by the tappet gear; said two contacts when actuated by the tappet gear so as to move relatively to said conducting part being brought into electrical contact therewith and closing the said circuit and causing rotation of the motor, which rotation moves said conducting part out of contact with the said two contacts; substantially as described.

5. In apparatus for operating the feed-screw of a reciprocating tool, in combination;—an electric motor adapted to drive the feed screw; a circuit, including a source of potential, which circuit when closed causes current to be supplied to the motor; a conducting part rotatably mounted and geared to the feed motor; two contacts rotatably mounted and actuated by the tappet gear through a ratchet and pawl device; and a mask device to regulate the amount of angular movement imparted to the contacts for a given movement of the tappet rod; substantially as described.

6. In apparatus for operating the feed-screw of a reciprocating tool, in combination;—an electric motor adapted to drive the feed screw; a circuit, including a source of potential, which circuit when closed causes current to be supplied to the motor; a conducting part rotatably mounted and geared to the feed motor; two contacts rotatably mounted and actuated by the tappet gear through a ratchet and pawl device; a mask device to regulate the amount of angular movement imparted to the contacts for a given movement of the tappet rod; and a rheostat resistance device connected to the said mask and adapted to control the speed of the motor; substantially as described.

7. In apparatus for operating the feed-screw of a reciprocating tool, in combination;—an electric motor adapted to drive the feed screw; a circuit, including a source of potential, which circuit when closed causes current to be supplied to the motor; a brake adapted to arrest the motor; two insulated conducting parts rotatably mounted and geared to the feed motor; three contacts rotatably mounted and actuated by the tappet gear through a ratchet and pawl device; two of the said contacts when actuated by the said device making contact with one of the said conducting parts and closing the said circuit, whereupon the motor rotates and moves the said conducting part away from said two contacts, whereupon the two other contacts make contact with the second conducting part and close a circuit which applies the brake; substantially as described.

8. In apparatus for operating the feed-screw of a reciprocating tool, in combination;—an electric motor adapted to drive the feed screw; a circuit, including a source of potential, which circuit when closed causes current to be supplied to the motor; a brake resistance adapted to be put in circuit with the motor armature; two insulated conducting parts rotatably mounted and geared to the feed motor; three contacts rotatably mounted and actuated by the tappet gear through a ratchet and pawl device; two of the said contacts when actuated by the said device making contact with one of the said conducting parts and closing the said circuit, whereupon the motor rotates and moves the said conducting part away from said two contacts, whereupon the two other contacts make contact with the second conducting part and connect the said resistance across the motor armature; substantially as described.

In testimony whereof we affix our signatures in presence of two witnesses.

ARTHUR PEMBERTON WOOD.
ROBERT STAFFORD McLEOD.

Witnesses:
 ERWALD SIMPSON MOSELEY,
 MALCOLM SMETHURST.